Sept. 6, 1938.                T. A. RICH                 2,129,537
AMPERE-SQUARED-HOUR METER
Filed Aug. 13, 1937
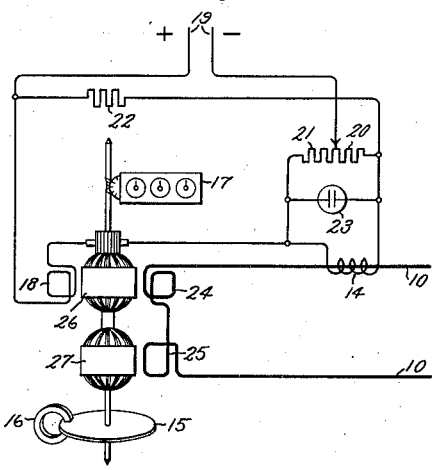
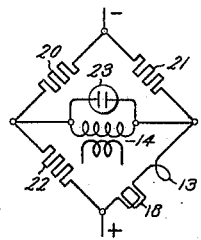
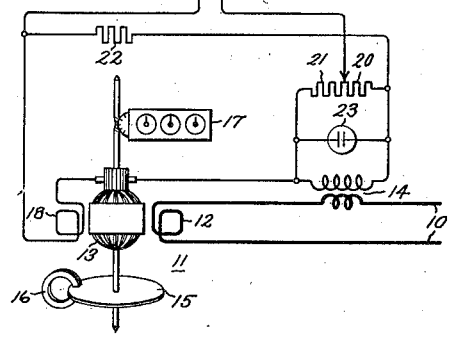
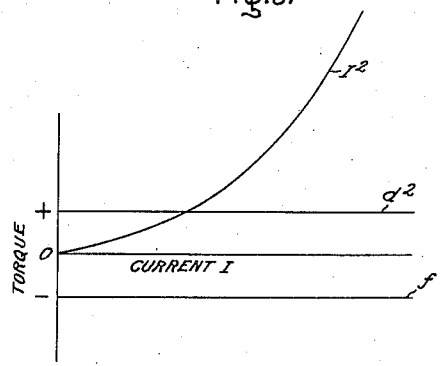
Inventor:
Theodore A. Rich,
by Harry E. Dunham
His Attorney.

Patented Sept. 6, 1938

2,129,537

UNITED STATES PATENT OFFICE 2,129,537

AMPERE-SQUARED-HOUR METER

Theodore A. Rich, Schenectady, N. Y., assignor to General Electric Company, a corporation of New York Application August 13, 1937, Serial No. 158,940

7 Claims. (Cl. 171—34)

My invention relates to alternating current meters of the ampere-squared-hour type and its object is to improve the accuracy and extend the useful load range of such meters. This is accomplished, according to my invention, by providing such meters with light load compensation or, to state it in another way, to provide such meters with an auxiliary torque equivalent to the constant friction losses of the meter.

The features of my invention which are believed to be novel and patentable will be pointed out in the claims appended hereto. For a better understanding of my invention, reference is made in the following description to the accompanying drawing in which Fig. 1 illustrates the invention as applied to an ampere-squared meter designed for heavy currents and employing multiple astatic meter elements. Fig. 2 illustrates the invention where the astatic arrangement is unnecessary due to the moderate currents employed. Fig. 3 is a curve showing the friction and load torque characteristics of a meter of the type under consideration which will be referred to in explaining the invention. Fig. 4 represents the bridge compensating circuit of Fig. 2 redrawn for clarification.

I shall first describe the simplest embodiment of my invention shown in Fig. 2, and in both Figs. 1 and 2, I shall use like reference characters to designate similar parts.

In Fig. 2, 10 represents a circuit in which an alternating current of variable quantity flows, and 11 is an ampere-squared-hour meter for measuring and integrating the square of the current flowing in circuit 10. The meter comprises a stationary current coil 12 connected directly in circuit 10, and a commutated armature winding 13 supplied by a current proportional to the current of circuit 10 through a current transformer 14. The meter is provided with the customary rotary drag disc 15 and drag magnet 16 to produce a speed proportional to torque, and with a register 17 to count the rotations made by the armature in terms of ampere-squared-hours. In order to apply light load compensation to such a meter, I include a stationary compensating coil 18 in the circuit supplied from current transformer 14, and then inject into this circuit a constant direct current from any suitable source 19. The constant direct current is introduced into the armature circuit in such a way as to prevent any direct current flowing in the secondary winding of transformer 14. To this end a bridge circuit is used having four arms as follows: resistance section 20, resistance section 21, resistor 22 and the coil 18 and armature 13 as the fourth arm. This bridge circuit may be redrawn as in Fig. 4. The secondary of transformer 14 is connected across points of the bridge which are made to have equal direct current potential and hence the accuracy of the current transformer is not impaired by having direct current in its secondary. The transformer, nevertheless, supplies alternating current to the armature 13 and meter coil 18 proportional to the current flow in circuit 10, and a constant direct current is likewise supplied to this armature circuit. A current limiting neon lamp gap 23 is preferably connected across the transformer secondary. The transformer secondary circuit may then otherwise be opened without danger or damage.

Let the alternating current in meter coil 12 be represented by I, the alternating current in meter coil 18 and armature 13 by $i$, and the constant direct current in meter coil 18 and armature 13 by $d$. The meter will now have three torques which may be represented as follows: An alternating current torque between coil 12 and armature 13 proportional to $I \times i$; a second alternating current torque between coil 18 and armature 13 proportional to $i^2$; and a direct current torque between coil 18 and armature 13 proportional to $d^2$. It will be evident that due to the difference in character of the direct and alternating currents in the armature and field windings of the meter that no meter torque will result from reaction of a field flux produced by a current of one character with an armature current of the other character.

The total alternating current torque is thus proportional to $i(I+i)$. However, $i$ is some constant fraction K of I, and hence the alternating current torque is proportional to $I^2 (K+K^2)$. Since $(K+K^2)$ is also a constant the alternating current torque of the meter is proportional to the square of the current I in line 10, and this torque may be plotted against current I as the curve $I^2$ Fig. 3.

The direct current torque $d^2$ is constant because $d$ is constant and this constant torque may be represented by the straight line $d^2$ Fig. 3. If now the positive torque $d^2$ be made equal to the friction losses in the meter represented as a constant negative torque $f$ in Fig. 3 the meter will be properly compensated for this friction and the resultant torque of the meter will be strictly proportional to $I^2$ which is what is desired. All of the three torques of the meter as described above are preferably such as to produce rotation in the same direction. Then by setting the direct current $d$ supplied to the proper value, the proper amount of friction or light load compensation may be obtained and the meter will then have a good accuracy over a very wide variation in I.

Occasionally when the load current, supplied directly to the terminals of a meter, is very high and only a few turns are employed in the main current coil, the current in the leads to the meter may produce an error. For example, one lead wire or both may be so disposed as to act like another turn or partial turn in the main coil.

This type of error may be avoided by providing two meter elements as shown in Fig. 1, and arranging the main current coils designated 24 and 25 astatically. Coil 24 is wound in the opposite direction to coil 25. The armatures for these two coils are designated as 26 and 27. The light load compensation needs to be applied to only one meter element as represented. The two armature windings are in series and are fed through the single commutator. Circulation of the direct current compensation current in armature 27 has no torque effect because there is no stationary direct current coil on this meter element.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent in the United States is:

1. An alternating current meter of the ampere-squared hour type having a stationary main current coil and a cooperating armature both supplied by proportional alternating currents, a stationary compensating coil also cooperating with said armature and connected in series therewith, and means for supplying a constant direct current to said armature and compensating coil sufficient to supply a torque, substantially equal to the light load losses of the meter.

2. An alternating current meter comprising a main stationary current coil, a commutated armature cooperating with said coil, a circuit supplying alternating current to said main coil, current reducing means connected between said circuit and armature whereby the armature is also supplied by alternating current from said circuit proportional to that supplied to the main coil, a stationary light load compensating coil on said meter cooperating with said armature and connected in series therewith, and means for supplying a constant direct current to said armature and compensating winding, said last mentioned means including a direct current supply and circuit connections across said current reducing means which are of equal direct current potential.

3. An alternating current meter having a main stationary coil and a cooperating armature winding, an alternating current circuit supplying said coil, current reducing means connected between said circuit and armature whereby the latter is supplied by an alternating current proportional to that supplied to said main coil, a stationary light load compensating winding on said meter also cooperating with said armature, a direct current supply and a bridge circuit connected thereto through which a constant direct current is supplied to said compensating coil and armature in series, the current reducing means supplying said armature through connections to said bridge circuit which are of equal direct current potential whereby direct current is prevented from flowing through said current reducing means.

4. An alternating current meter comprising a stationary winding, an armature winding cooperating therewith, an alternating current circuit supplying both said windings with variable currents, a current transformer between said circuit and the armature winding, a stationary light load compensating coil cooperating with said armature winding to produce torque in the same direction as the torque resulting from the cooperation with said stationary winding, means for supplying a constant direct current to said armature winding and compensating coil in series relation, said means including a bridge circuit in which said armature winding and compensating coil are included, direct current supply terminals to said bridge circuit and connections from said bridge circuit to said current transformer through which alternating current is supplied to said armature winding, said connections being to points of said bridge circuit which are of equal direct current potential.

5. An alternating current meter of the ampere-squared-hour type comprising a pair of rotatable armatures connected in series and mounted on the same shaft, a commutator through which both armatures are supplied, stationary main current coils for each of said armatures, said current coils being connected in series and arranged to be astatic with respect to each other, an alternating current circuit in which said coils are included, a stationary light load compensating coil cooperating with one of said armatures, a bridge circuit including said compensating coil and said armatures in series relation as one of its arms, direct current terminals to said bridge circuit for supplying a constant direct current to said compensating coil and armature bridge arm, and a current transformer connected between said alternating current circuit and bridge circuit to supply an alternating current to said compensating coil and armature bridge arm, which current is less than, but proportional to, the current in said alternating current circuit, the connections of said transformer to said bridge being made at points which are of equal direct current potential.

6. In an ampere-squared type of meter a rotary armature winding and a stationary winding cooperating with said armature winding, means for supplying a variable alternating current to said windings in series to produce a variable torque proportional to the square of such current, and means for supplying a constant direct current to said windings in series to produce a constant torque subtantially equal to the light load losses of said meter.

7. An electric meter of the integrating type having a rotary armature winding provided with a commutator, two stationary field windings in inductive torque producing relation with said armature, a circuit to be metered, connecting means for conveying variable currents derived from the circuit to be metered to said commutated armature winding and to said field windings to produce a variable measurement torque in the meter and means for providing an additional light load compensating torque in said meter which is constant and independent of the variable measurement torque comprising a source of supply and connections for conveying a constant current from said source of supply to said commutated armature winding and one of said field windings, the current supplied to produce light load compensation being sufficiently different in character from the currents supplied to produce measurement torque that no torque is produced in the meter by reason of interaction between the compensating current field flux and the measurement torque producing armature current or vice versa.

THEODORE A. RICH.